May 20, 1958 A. FERRI 2,835,516
COUPLING FOR CONNECTING THE ELEMENTS OF DEMOUNTABLE
STRUCTURES, AS FRAMEWORKS, SCAFFOLDING
Filed Jan. 9, 1953 AND THE LIKE
2 Sheets-Sheet 1
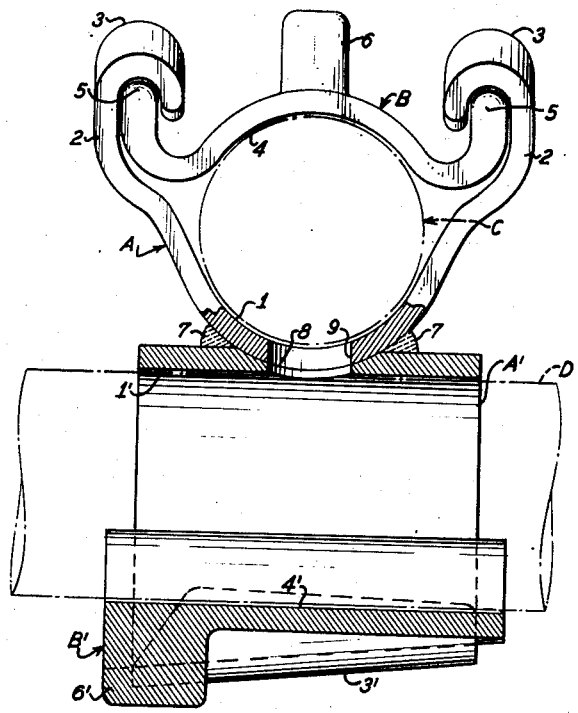
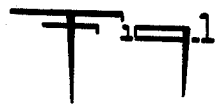
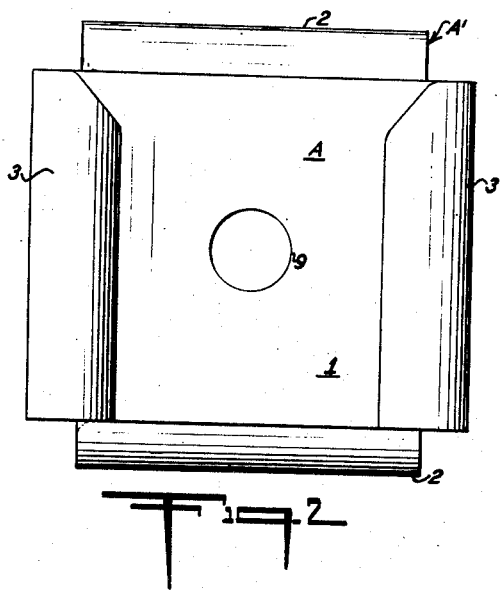

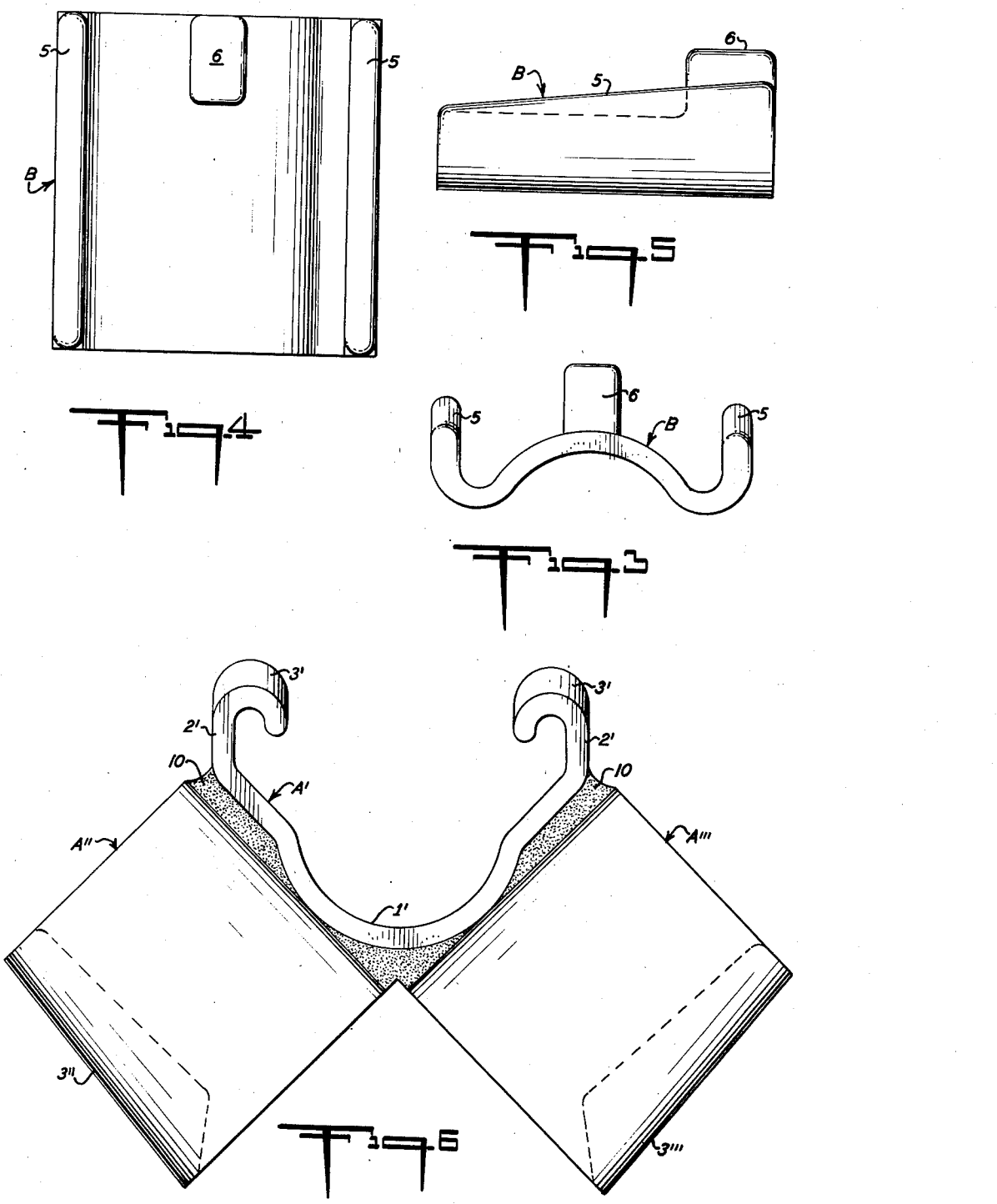

United States Patent Office 2,835,516
Patented May 20, 1958

2,835,516

COUPLING FOR CONNECTING THE ELEMENTS OF DEMOUNTABLE STRUCTURES, AS FRAMEWORKS, SCAFFOLDING AND THE LIKE

Aroldo Ferri, Milan, Italy

Application January 9, 1953, Serial No. 330,402

Claims priority, application Italy January 19, 1952

4 Claims. (Cl. 287—49)

The present invention relates to a coupling for connecting the elements of demountable structures, as frameworks, scaffolding and the like.

Couplings for demountable structures are known, in which the locking force of the two elements gripping the rods of the structure by friction is not obtained by screw means but by the collaboration of the two elements through side guides inclined with respect to the rod axis. Said couplings are defective in that they require accurate forming of the guides to obtain the interchangeability of the parts, they are heavy, being formed by casting, and require reinforcement ribs.

Besides, in the known couplings the sliding planes of the two guides are convergent toward the rod's axis, so that the guides themselves assure the centering of the two elements, in collaboration with the centering effect automatically generated by the rod; this double centering effect inherently resulting, on account of the imperfections of the parts, in transversal stresses not otherwise provided for.

In order to avoid the above defects, the coupling according to the present invention, is substantially characterised by the fact that the lateral guides, which are inclined with respect to the rod's axis are defined on one of the coupling elements by bending over or reverting to a substantially semi-circular shape, the end portions of the opposite sides of a semi-cylindrical seat housing the rod, and in the other cooperating coupling element by means of bends in its longitudinal end borders at opposite sides of an arcuate seat for the rod and in the direction of the locking force exerted between the two elements, so that the edges of the bent borders may collaborate with bent over end portions of the first mentioned coupling element, the generating lines of the bent over end portions and the edges of the end borders being inclined with respect to the axis of the rod containing seats, and, hence, also with respect to the axis of the rod itself.

The invention will now be described in greater detail with reference to the annexed schematic drawing showing illustrative embodiments of the invention, and wherein:

Figure 1 is an elevational view, partly broken away and in section, of a coupling according to the invention, for securing together two right angularly related rods;

Figure 2 is a plan view of the same, without the removable elements of the coupling;

Figures 3, 4 and 5 respectively illustrate in a front elevation, in plan and side elevation the removable one of the elements of the coupling of Fig. 1.

Figure 6 is a front elevational view of a part of a coupling for three rods arranged at right angles to each other.

With reference to Figures 1 to 5, the letter A identifies one element of a coupling embodying this invention, while the letter B identifies the other cooperating element of the coupling.

Element A is preferably made from shaped sheet metal and comprises a central substantially semi-cylindrical portion 1 for seating a tubular rod C of the structure, and two side parts 2 substantially parallel to each other and extending from the opposite sides of central portion 1, with the ends of the side parts 2 being inwardly bent to define semi-cylindrical parts 3 whose generating lines are inclined with respect to the generating lines of seat portion 1. Element B also has a central seat portion 4 formed as part of a cylinder and enclosing tubular rod C in collaboration with seat portion 1. The borders of element B are bent over in the direction away from the concavity of its central seat portion so as to substantially align with the closure force (that is, parallel to the center longitudinal symmetry plane) and have their edges and generating lines inclined with respect to seat 4 by an angle equal to the angle of inclination of parts 3. Thus, borders 5 are housed within the semi-cylindrical hollows defined by parts 3, and provide the connection between the two elements A and B. By displacing said elements relative to each other in an axial direction, one obtains the radial approach or separation of seat portions 1 and 4, that is, the gripping of rod C or the freeing of it. Such relative axial displacement is obtained by hammer strokes struck in the direction of the axis of tubular element C, on one side or the other of a rigid radial nose 6 which is provided on the exterior of seat portion 4 of element B. This element B also can be made of a shaped metal plate or, preferably, of malleable iron or cast steel. Considering that end borders 5 are bent over arc-wise and supposing that there is a certain amount of side play between elements A and B, it is evident that the centering effect on said elements is realised, through arcuate seat portions 1 and 4 cooperating with rod C itself, without imposing dangerous internal stresses due to the resistance to transverse movement of the guides. For the purpose of facilitating the fitting together of the two elements A and B, the edges of the parts 3 and 5 are rounded off (as is clearly to be seen in Figures 2 and 5). The particular shape of element A prevents spreading apart of the sides thereof in response to the forces transmitted to the parts 3 thereof by the borders 5 of element B.

The coupling can be constituted merely by the two elements A and B described above in case two rods are to be coupled together with their ends axially aligned. In Figures 1 and 2, however, the coupling comprises two groups of the elements described above and identified by the letters A and B and the letters A' and B', respectively, with parts A and A' being disposed at 90° with respect to one another, to connect two tubular rods disposed at right angles with respect to each other. The connection between the two elements A and A' with the seat portions 1 and 1' thereof facing away from each other is achieved by means of a peripheral welding seam 7. With a view to reducing the distance between the axes of the two coupled rods C and D and to increase the length of the welding seam, one of the two elements (element A' in the example illustrated) has an arcuate recess 8 coaxial with rod C and having a radius corresponding to the outside radius of seat portion 1 of the element A. The same result can be obtained by a hole normal to the axis of the tubular element of the structure. A hole of this kind, that also has a lightening function, is indicated at 9 in Figures 1 and 2.

Of course, the coupling can also comprise more than two groups of elements similar to A and B (and oriented with respect to one another at an angle differing from 90°) as illustrated in Figure 6 wherein the groups are three in number and oriented in three directions at right angles to each other. The two coplanar elements A" and A''' at right angles to each other are connected by means of welding 10 to element A' which extends normal to the plane of the other elements.

It is to be understood that the invention is not limited to the particular structure of the illustrative embodiments described above and shown in the drawings, and that various changes and modifications may be effected in such embodiments without departing from the scope or spirit of the invention as defined in the appended claims.

I claim:

1. A coupling for connecting together rods making up a demountable structure, such as, a framework, scaffolding and the like; said coupling comprising at least one group of two elements, one of said elements including a substantially semi-cylindrical seat portion having extensions of the opposite side edges thereof bent over to form reverted semi-cylindrical guide parts, and the other of said elements including an arcuate seat portion having the same curvature as said semi-cylindrical seat portion to cooperate with the latter in embracing a rod, the longitudinal borders of said other element, at the opposite sides of the arcuate seat portion thereof, being bent in a radial direction with respect to the cylinder and slidably engageable in said semi-cylindrical guide parts of the latter, the generating axes of said guide parts and the edges of said bent longitudinal borders being inclined equally with respect to the axes of the seat portions of said elements so that relative axial displacement of said elements in one direction will draw the seat portions of the latter radially together for clamping a rod embraced by said seat portions, said semi-cylindrical guide parts having internal diameters exceeding the thickness of said bent longitudinal borders to provide a limited transverse play of the latter within said guide parts so that said seat portions can center themselves on an embraced rod without producing internal stresses within the coupling.

2. A coupling for connecting together rods making up a demountable structure, such as, a framework, scaffolding and the like; said coupling comprising at least one group of two elements, one of said elements including a substantially semi-cylindrical seat portion having extensions of the opposite side edges thereof bent over to form reverted semi-cylindrical guide parts, and the other of said elements including an arcuate seat portion having the same curvature as said semi-cylindrical seat portion to cooperate with the latter in embracing a rod, the longitudinal borders of said other element, at the opposite sides of the arcuate seat portion thereof, being bent in a radial direction with respect to the cylinder and slidably engageable in said semi-cylindrical guide parts of the latter, the generating axes of said guide parts and the edges of said bent longitudinal borders being inclined equally with respect to the axes of the seat portions of said elements so that relative axial displacement of said elements in one direction will draw the seat portions of the latter radially together for clamping a rod embraced by said seat portions, said semi-cylindrical guide parts having internal diameters exceeding the thickness of said bent longitudinal borders to provide a limited transverse play of the latter within said guide parts so that said seat portions can center themselves on an embraced rod without producing internal stresses within the coupling; said coupling further comprising a second group of elements identical to the first mentioned group of elements, said one element of the first group and said one element of the second group being welded together at the semi-cylindrical seat portions thereof with the concavities of said semi-cylindrical seat portions facing away from each other so that the coupling can secure together two rods respectively embraced by related groups of elements, at least one of said welded together elements having a recess in the convex surface thereof receiving the convex surface of the other of said welded together elements thereby to reduce the radial distance between the axes of said semi-cylindrical seats and the rods embraced in the latter and to increase the length of the perimeter of the area of contact between the convex surfaces available for a welding seam.

3. A coupling for connecting together rods making up a demountable structure, such as, a framework, scaffolding and the like; said coupling comprising at least one group of two elements, one of said elements including a substantially semi-cylindrical seat portion having extensions of the opposite side edges thereof bent over to form reverted semi-cylindrical guide parts, and the other of said elements including an arcuate seat portion having the same curvature as said semi-cylindrical seat portion to cooperate with the latter in embracing a rod, the longitudinal borders of said other element, at the opposite sides of the arcuate seat portion thereof, being bent in a radial direction with respect to the cylinder and slidably engageable in said semi-cylindrical guide parts of the latter, the generating axes of said guide parts and the edges of said bent longitudinal borders being inclined equally with respect to the axes of the seat portions of said elements so that relative axial displacement of said elements in one direction will draw the seat portions of the latter radially together for clamping a rod embraced by said seat portions, said semi-cylindrical guide parts having internal diameters exceeding the thickness of said bent longitudinal borders to provide a limited transverse play of the latter within said guide parts so that said seat portions can center themselves on an embraced rod without producing internal stresses within the coupling; said coupling further comprising a second group of elements identical to the first mentioned group of elements, said one element of the first group and said one element of the second group being welded together at the semi-cylindrical seat portions thereof with the concavities of said semi-cylindrical seat portions facing away from each other so that the coupling can secure together two rods respectively embraced by related groups of elements, at least one of said welded together elements having a hole extending radially through the seat portion thereof at a zone of the latter contacting the seat portion of the other of said welded together elements.

4. A coupling for connecting together rods making up a demountable structure, such as, a framework, scaffolding and the like; said coupling comprising at least one group of two elements, one of said elements including a substantially semi-cylindrical seat portion having extensions of the opposite side edges thereof bent over to form reverted semi-cylindrical guide parts, and the other of said elements including an arcuate seat portion having the same curvature as said semi-cylindrical seat portion to cooperate with the latter in embracing a rod, the longitudinal borders of said other element, at the opposite sides of the arcuate seat portion thereof, being bent in a radial direction with respect to the cylinder and slidably engageable in said semi-cylindrical guide parts of the latter, the generating axes of said guide parts and the edges of said bent longitudinal borders being inclined equally with respect to the axes of the seat portions of said elements so that relative axial displacement of said elements in one direction will draw the seat portions of the latter radially together for clamping a rod embraced by said seat portions, said semi-cylindrical guide parts having internal diameters exceeding the thickness of said bent longitudinal borders to provide a limited transverse play of the latter within said guide parts so that said seat portions can center themselves on an embraced rod without producing internal stresses within the coupling; said coupling further comprising second and third groups of elements identical to the first mentioned groups of elements, said first, second and third groups of elements being arranged with the axes of their seat portion disposed at right angles to each other, said one elements of said second and third groups being arranged with the axes of their semi-cylindrical seat portions in a single flat plane and at right angles to each other, said one element of the first group being arranged with the axis of its semi-cylindrical seat portion extending normal to said flat plane, the convex surfaces of the semi-cylindrical seat portions of said one elements of the second and third groups being welded to the convex surface of said one element of the first group.

References Cited in the file of this patent

UNITED STATES PATENTS

| | | |
|---|---|---|
| 1,320,820 | Aird | Nov. 4, 1919 |
| 1,397,453 | Rekar | Nov. 15, 1921 |
| 2,113,196 | Jones | Apr. 5, 1938 |
| 2,467,604 | Tinnerman et al. | Apr. 19, 1949 |

FOREIGN PATENTS

| | | |
|---|---|---|
| 24,353 | Great Britain | 1894 |
| 103,641 | Australia | May 17, 1937 |
| 424,356 | Italy | Aug. 18, 1947 |
| 602,055 | Great Britain | May 19, 1948 |
| 632,189 | Great Britain | Nov. 17, 1949 |

OTHER REFERENCES

Publication: "How to Connect Tubing," on page 134 of Product Engineering, of July 1950.